United States Patent
Olsson et al.

(10) Patent No.: US 8,426,792 B2
(45) Date of Patent: Apr. 23, 2013

(54) SOLAR REFLECTOR APPARATUS WITH INDEPENDENTLY CONTROLLED BAIL-ARMS

(75) Inventors: Mark S. Olsson, La Jolla, CA (US); Ray Merewether, La Jolla, CA (US); Lucas John Zipp, La Jolla, CA (US); Matthew John Thompson, San Diego, CA (US)

(73) Assignee: SeekTech, Inc., San Diego, CA (US)

( * ) Notice: Subject to any disclaimer, the term of this patent is extended or adjusted under 35 U.S.C. 154(b) by 463 days.

(21) Appl. No.: 12/606,130

(22) Filed: Oct. 26, 2009

(65) Prior Publication Data

US 2010/0101560 A1     Apr. 29, 2010

Related U.S. Application Data

(60) Provisional application No. 61/108,774, filed on Oct. 27, 2008.

(51) Int. Cl.
*G01C 21/02*     (2006.01)

(52) U.S. Cl.
USPC .................................................. 250/203.4

(58) Field of Classification Search ............... 250/203.4; 353/3; 126/600, 605, 606, 696
See application file for complete search history.

(56) References Cited

U.S. PATENT DOCUMENTS

| 4,332,239 | A * | 6/1982 | Hotine | 126/576 |
| 6,971,317 | B2 * | 12/2005 | McKoy | 104/72 |
| 2006/0201498 | A1 * | 9/2006 | Olsson et al. | 126/605 |
| 2009/0212766 | A1 * | 8/2009 | Olson et al. | 324/207.2 |
| 2009/0314280 | A1 * | 12/2009 | Banerjee | 126/606 |

* cited by examiner

*Primary Examiner* — Thanh Luu
(74) *Attorney, Agent, or Firm* — Steven C. Tietsworth, Esq.

(57) ABSTRACT

A planar reflector is supported on a ball-and-socket joint and can be independently pivoted about X and Y axes by magnetic drives that propel corresponding bail arms hingedly connected to the reflector. Control is achieved using the outputs of a multi-axis magnetic field sensor closely positioned adjacent a spherical magnet embedded in the ball of a ball-and-socket joint that supports the reflector for pivoting motion.

22 Claims, 18 Drawing Sheets

SOLAR REFLECTOR APPARATUS WITH INDEPENDENTLY CONTROLLED BAIL-ARMS

CROSS-REFERENCE TO RELATED APPLICATION

This application claims priority under 35 USC Section 119(e) from the similarly entitled U.S. Provisional Application Ser. No. 61/108,774 filed Oct. 27, 2008.

FIELD OF THE INVENTION

The present invention relates to systems and methods for utilizing the energy of the Sun, and more particularly, to systems and methods for tracking the Sun to re-direct and concentrate incident solar radiation for lighting, heating and photovoltaic applications.

BACKGROUND

Increased usage of renewable energy sources such as solar radiation is important in reducing dependence upon foreign sources of oil and decreasing greenhouse gases. Devices have been developed in the past that track the motion of the Sun to re-direct and concentrate incident solar radiation. Prior art includes, for example, the use of a parabolic dish mirror with a central axis that is pointed generally toward the Sun. Incidental solar radiation is received and reflected by the parabolic dish mirror and concentrated at its focus, where a thermal target can be mounted so that it can be heated. Such a parabolic dish mirror has been supported for independent movement by a two-axis tracking support mounted atop a supporting structure such as a tower. In some instances, optical encoders associated with the tracking support provide signals indicative of the direction and amount of rotation of the parabolic dish mirror so that motor drives and a control system can be used to track the Sun and increase the efficiency of the energy transfer.

Similar existing devices utilize a parabolic trough mirror whose focal line aligns with the Sun. A tracking support carries the parabolic trough mirror, typically mounted atop a tower. Incident light rays from the Sun are collected and reflected by the parabolic trough mirror and concentrated on a pipe that extends along the focal line effecting a heat transfer to a fluid such as water or liquid sodium. The heating efficiency can be improved by targeting mechanisms that cause the parabolic trough mirror to pivot and track the Sun.

Another variation of the prior art utilizes a heliostat flat mirror that receives incident light rays from the Sun and reflects them against a thermal target atop a tower. The flat-mirror heliostat may be supported by a two-axis tracking device which may be elevated on a tower. Drive mechanisms may control the azimuth and elevation of the flat mirror to keep the Sun's rays focused on the target thermal collector.

Cost and complexity of design are frequently encountered disadvantages to the prior art devices in this field. Tracking frames are historically often cumbersome and require significant power to drive in tracking. Additionally, the need for individual tracking sensor units on mirror heliostats in order to keep them individually pointed can significantly add to the expense of the units.

SUMMARY OF THE INVENTION

The present invention offers an improvement to the prior art in the design of tracking mechanisms and support frames, as well as an advanced method of controlling the orientation of an array. In accordance with the present invention, a solar tracking apparatus is supported by two pivoting arch-shaped bail arms and a central shaft providing optimum range of motion through an advanced magnetic drive and magnetic sensing system.

An advantageous use of magnetic linear drives moves the arch-shaped bail-arms in such a way as to position the mirror in any required orientation for maximum directed reflection of solar radiation.

An array of multiple reflectors of this design may be coordinated to maximize efficient use of incident solar radiation through a single-sensor central control system. An innovative method of controlling such an array by use of a single focal camera device is revealed, which enables multiple reflectors to be controlled in their orientation from a single control point.

DETAILED DESCRIPTION

The entire disclosures of U.S. Patent Application of Jan. 30, 2006 (U.S. Ser. No. 11/342,396) and U.S. patent application Ser. No. 11/763,267, filed on Jun. 14, 2007, Mark S. Olsson, are hereby incorporated by reference.

In an embodiment of the present invention, a mirror or other reflecting surface for collecting and reflecting incident solar radiation is supported for independent motion about a pair of axes. The reflecting surface is supported by a pair of arch-shaped bail-arms, each of which may pivot about one of the x and y plane axes of the mirror. At the intersection of the two plane axes of the reflector, a ball and socket joint is located such that the central vertical (z) axis of the mirror passes through its center. The socket portion of the joint is affixed to the center of the reflector.

Figure 1:
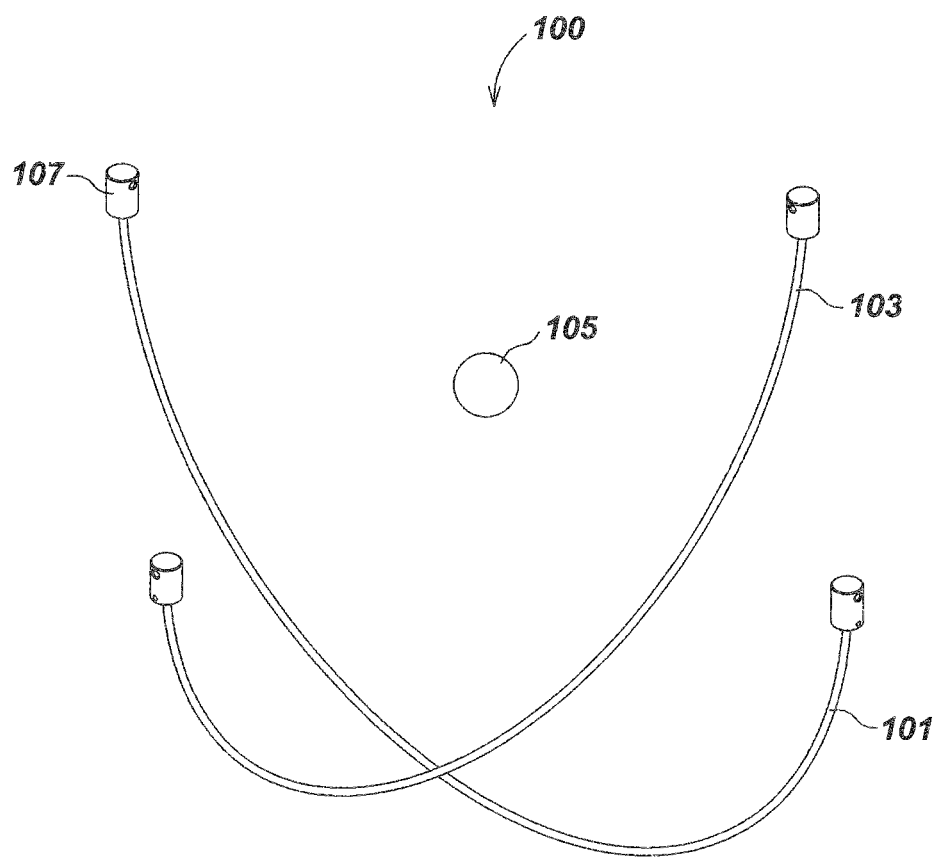
FIG. 1 illustrates a pair of the bail-arms and a central ball-joint assembly in accordance with an embodiment of the present invention.

Turning to FIG. 1, the two bail-arms (101, 103) are illustrated in their relative locations. One of the arms (101) is considered the fixed arm, while the other (103) is considered the unfixed arm. In FIG. 1, the ball component (105) of the ball-and-socket joint is illustrated to show its spatial relationship to the bail-arms 101, 103. The arch-shaped bail-arms terminate in hinge adaptors (such as 107). In the illustrated embodiment adaptor 107 is an Aluminum cylinder. The hinge adaptors 107 serve to connect the bail-arm ends to a rectangular planar reflector 201.

Figure 2:
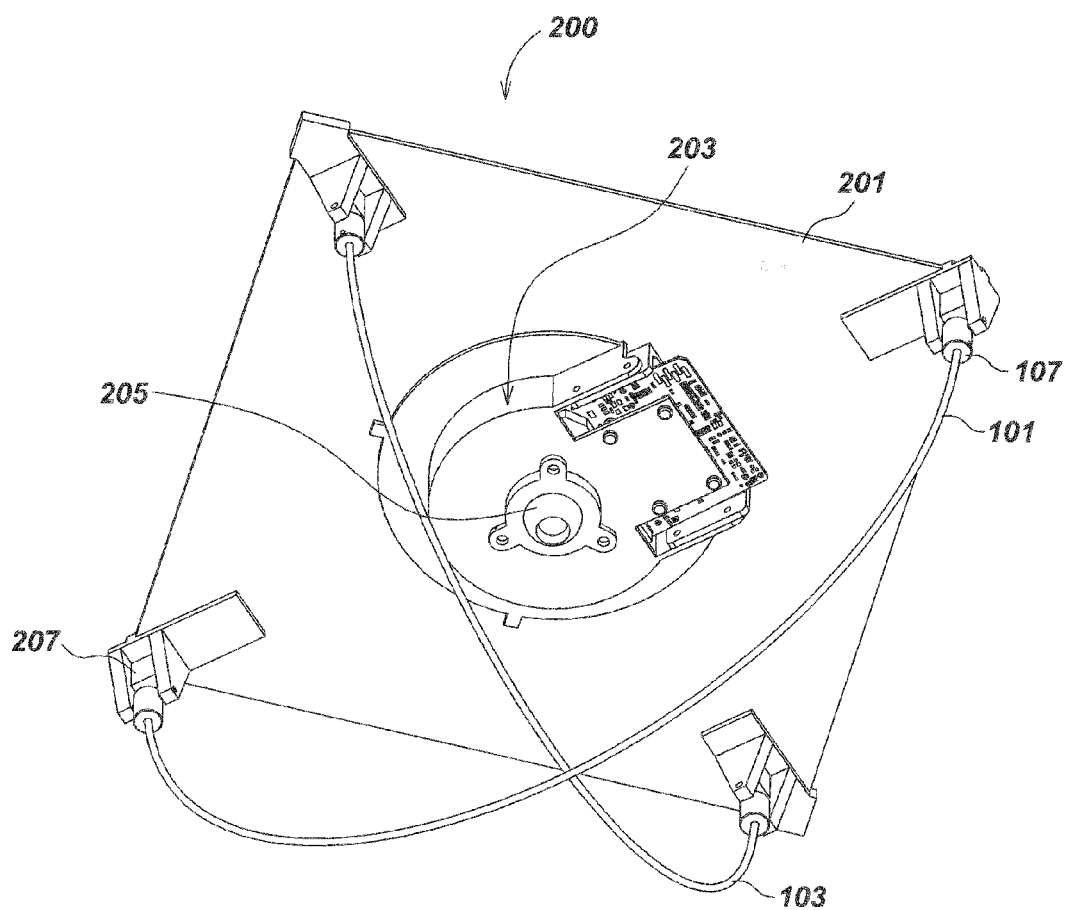
FIG. 2 is an isometric view from below of a reflector, illustrating the mounting of the central ball-joint assembly, the bail-arms and their respective hinges.

Turning to FIG. 2, the reflector assembly (200) is illustrated from below. In FIG. 2 the hinge adaptors 107 at the ends of the bail-arms (101, 103) are seen attached to the hinge pieces 207 at each corner of reflector 201. A mirror housing assembly 203 is centrally attached to the reflector 201 and contains logic circuitry for controlling drive motors (not illustrated in FIG. 2). The ball component 205 of the ball-and-socket joint is visible in FIG. 2. The ball component 205 has a threaded receptacle to attach it to a central shaft (not illustrated in FIG. 2). In the illustrated embodiment, the ball component 205 is a Delrin® plastic sphere drilled and tapped to house a composite magnet (not illustrated in FIG. 2) which is used in the magnetic positioning capability of the illustrated embodiment. The center of ball 205 acts as the central point of rotation for reflector 201 and the reflector assembly 200 including the mirror housing assembly 203, and as the threaded connector of the associated shaft (517 in FIG. 5). In the illustrated embodiment, the bail-arms are made of 0.125" thick round steel stock, bent to an 8" radius.

Figure 3:
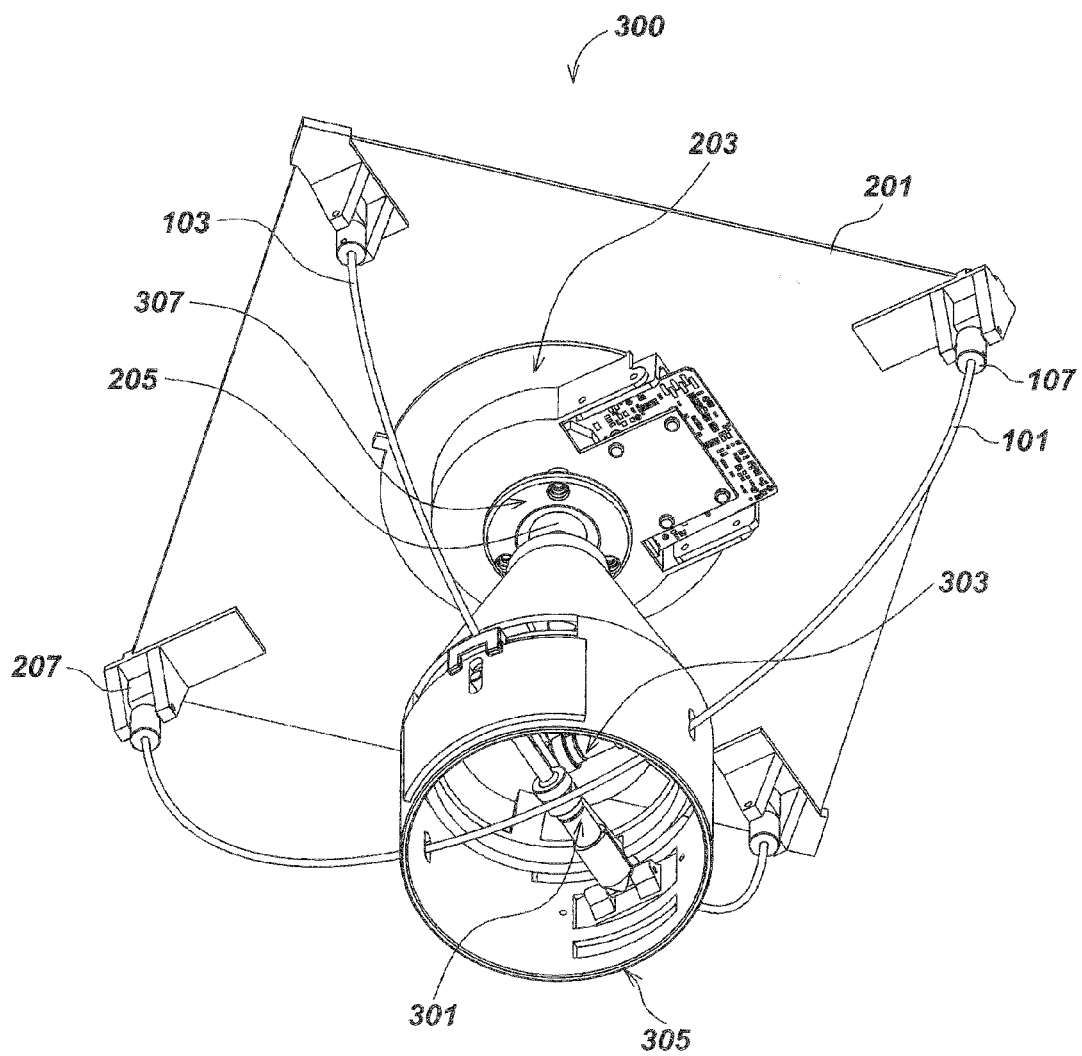
FIG. 3 illustrates the components of FIG. 2 combined with a central shaft, a support frame and a housing that form an embodiment of the solar reflector and drive control system of the present invention.

Turning to FIG. 3, the components of FIG. 2 are seen from below, assembled with a housing structure 305 in a compound assembly 300 comprising the reflector 201, a housing assembly 305, and a mirror housing assembly 203. In FIG. 3, bail-arms 101, 103 are led through separate slots in the sides of housing 305 so that the fixed bail-arm 101 is confined to rotate about the center of the ball 205 in only a single plane along its major cross-section and perpendicular to the plane created by the two pivot axes. The slots in the housing 305, through which the unfixed bail-arm 103 is led, allow the unfixed bail-arm 103 to rotate passively about the center of the ball 205 along its major cross-section. As in FIG. 2, each bail-arm is attached at its end to a corresponding hinge adaptor 107 which connects to a corresponding hinge component 207 fixed to reflector 201. The drive motor assemblies 301, 303 are located inside the housing assembly 305, mechanically associated with their respective bail-arms 101, 103.

Still referring to FIG. 3, within the housing assembly 305, the slots for the fixed bail arm 101 prevent it from rotating about the vertical axis of the shaft while the slots for the unfixed bail arm 103 do not. Both sets of slots allow for any tolerable irregularities in the radii of the two bail arms. Properly engineered, these slots provide a large amount of stability for both bail arms while allowing for the appropriate amount of rotation. The housing assembly 305 also houses the drive assemblies 301, 303.

In FIG. 3 the central shaft (517 in FIG. 5) terminates in ball 205 which supports a socket housing 307. The socket housing 307 is affixed to the top mirror housing assembly 203 and thus to the reflector 201 and allows the reflector to rotate freely around both x and y axes on the ball-and-socket joint. Only the lower portion of the ball 205 is visible in FIG. 3.

Figure 4:
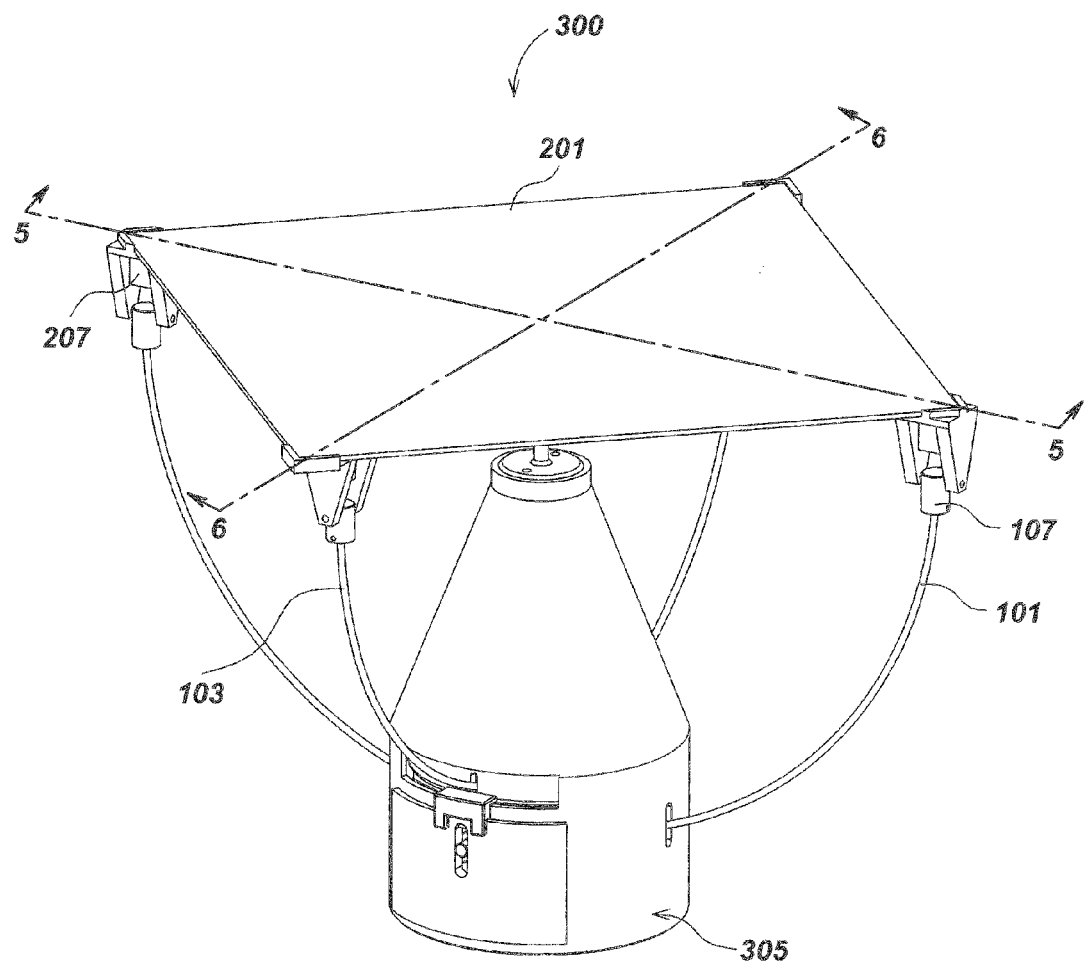
FIG. 4 is an isometric view from above of the system illustrated in FIG. 3.

Referring to FIG. 4 the compound assembly 300 includes the reflector 201, bail-arms 101, 103, hinge adaptors 107 and hinge components 207, connected with the housing assembly 305.

The system illustrated in FIGS. 3-6 is capable of determining and correcting the angular orientation of the reflector 201 in three dimensions, relative to its fixed base. This is accomplished by the inclusion of a three-axis Hall-effect sensor that generates signals representing the orientation of magnetic fields along the X, Y, and Z axes. In the illustrated embodiment, a magnet 511 is embedded inside the ball 205 of the ball-and-socket joint supporting the reflector 201, and a sensor capable of determining flux in three axes is located directly above it such that changes in the reflector's orientation produce detectable changes in the magnetic flux along the three axes detected by the sensor.

Figure 5:
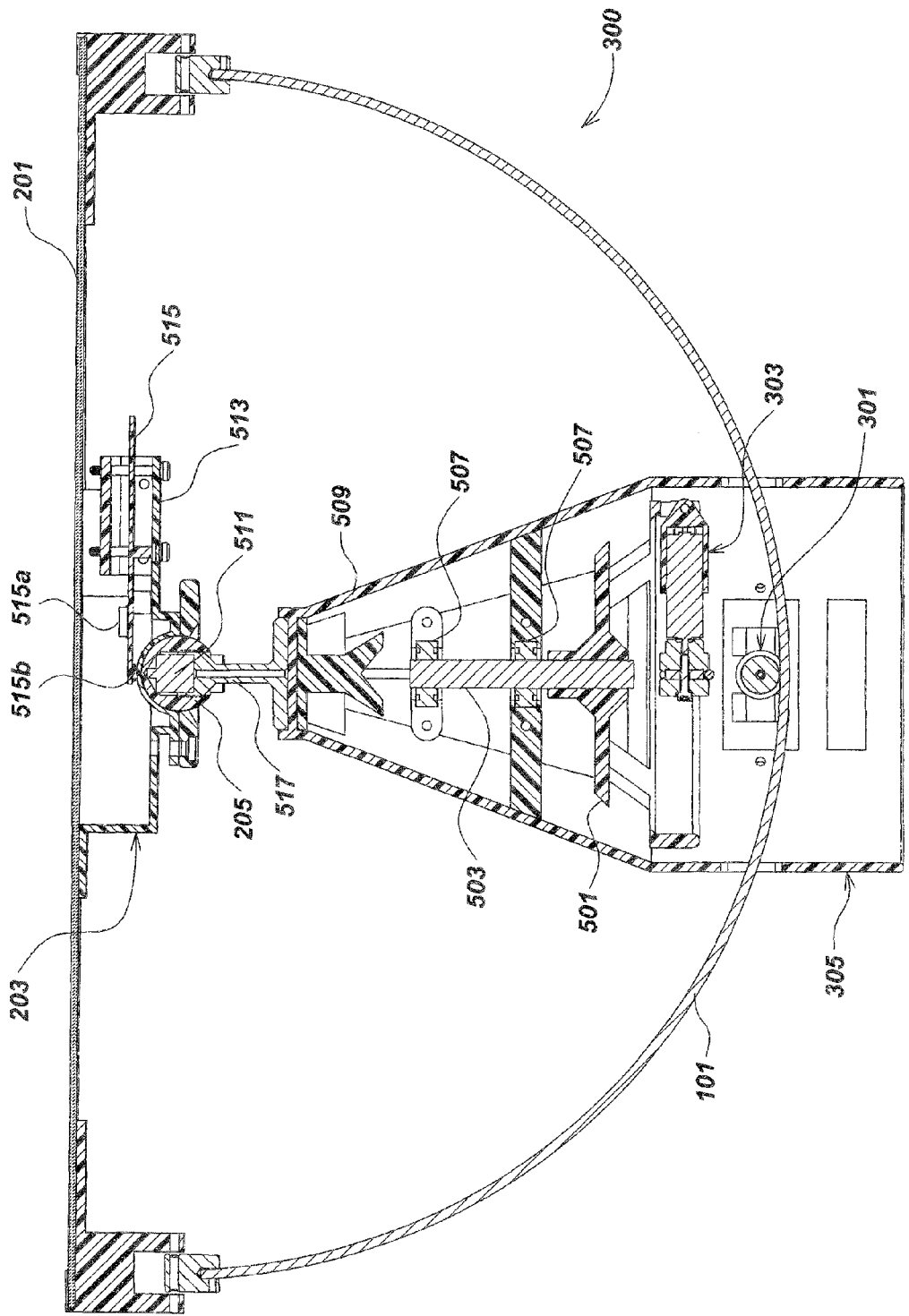
FIG. 5 is an enlarged vertical sectional view of the system of FIG. 4 taken along line 5-5 of FIG. 4.

Turning to FIG. 5, a section view of the compound assembly 300 is illustrated along the major plane of the fixed bail-arm 101 and the edge of reflector 201. Reflector 201 is attached to the mirror housing assembly 203. Within the mirror housing assembly 203 a chip socket mount 513 supports an integrated circuit board 515 which supports and electrically connects a microcontroller 515a, a three-axis magnetic sensor 515b and associated circuitry. The sensor 515b may comprise a commercially available Melexis® 90333 sensor. A ball interface and column assembly 517 supports the ball 205 at the upper end of the housing 509. Two bearings 507, retained by clips such as 501, for example, support a shaft 503. The magnet 511 is spherical and is mounted within ball 205. Drive motor assemblies 301, 303 are located within the overall housing assembly 305. The arc of the fixed bail-arm 101 is visible in FIG. 5. Rotation of motor assembly 301 governs the motion of bail-arm 101 and thus defines the tilt of reflector 201 relative to the horizontal plane in FIG. 5.

Still referring to FIG. 5, the magnet 511 is generally spherical and is preferably a composite magnet made of two parts. The outer part is a permanently magnetized neodymium ring magnet of 0.5" outer diameter and 0.5" in length, with an internal diameter of 0.125". The inner part of the magnet 511 is an axially magnetized cylinder-shaped neodymium magnet is placed through the center of the ring magnet forming the composite magnet 511. The axial cylinder-shaped magnet is inserted in such a way as to be flush with the bottom of the ring magnet and to protrude approximately 0.125" above the top of the ring magnet. The composite magnet 511 is embedded in a cavity formed in ball 205 in such a position that its flux level as detected at the sensor 515b for the z-axis approaches the sensor's maximum detection level for that axis. The composite magnet 511 is aligned such that its axis is centered with the center-point of the reflector 201. In FIG. 5, the three-axis magnetic sensor onboard the IC board 515 is positioned as close as practicable to the surface of ball 205 and with one axis of the sensor (X or Y) aligned with the bearing of the fixed bail-arm 101. This alignment is important because it facilitates angular calculations from the flux-levels detected by the sensor 515b.

Because the composite magnet 511 in FIG. 5 remains stationary with the ball affixed to the end of the central axle shaft, the movement of the three-axis sensor within the socket housing 513 causes changes in the flux readings output by the sensor 515b along the X, Y, and Z axes of the ball. These values are used to compute the angle of the reflector 201 using software algorithms known in the art and enabled in firmware stored in the memory portion of the circuit supported by the circuit board 515. The microcontroller 515a may have its own memory or it may rely on a separate memory supported on the circuit board 515.

Figure 6:
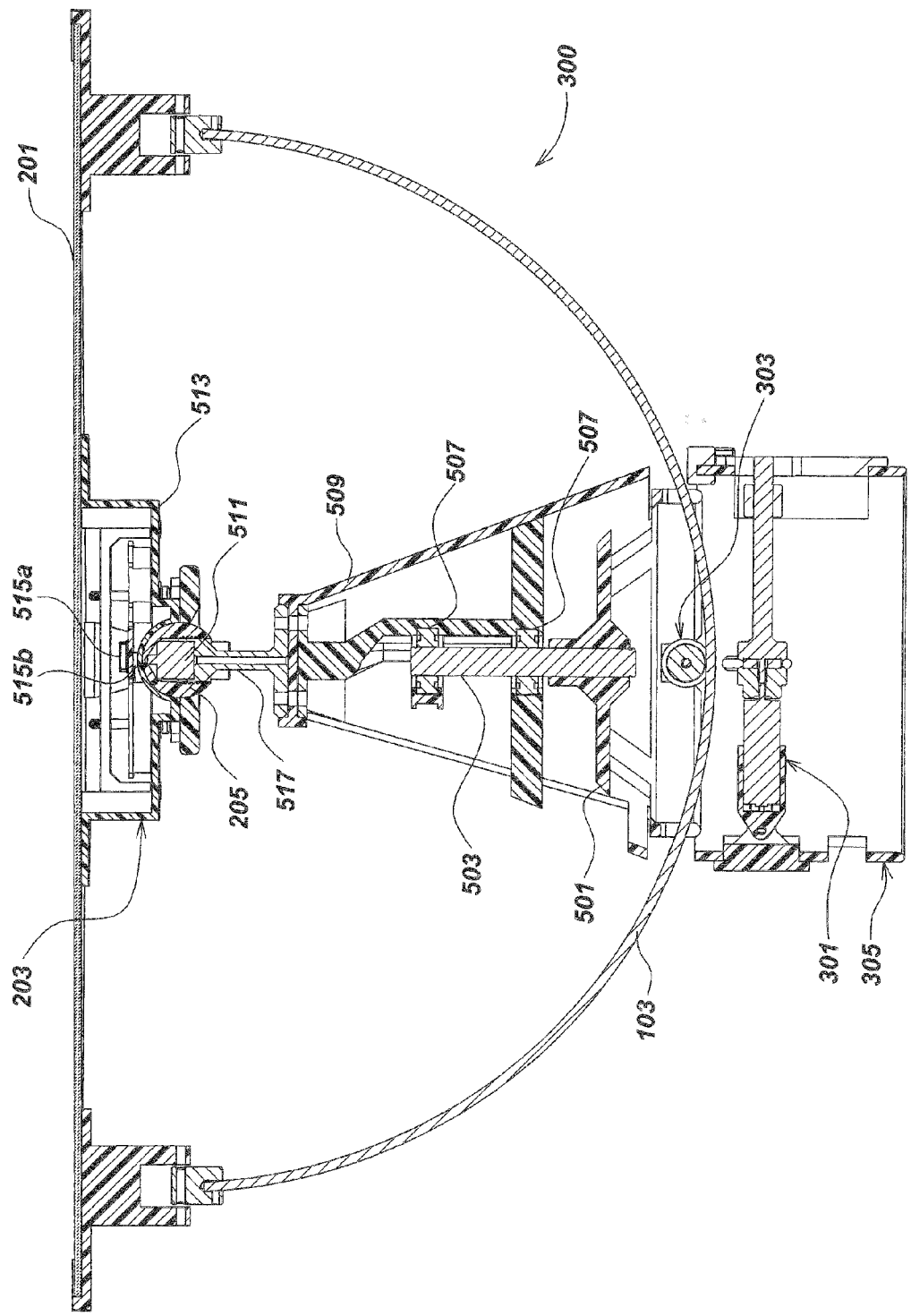
FIG. 6 is a view similar to FIG. 5 taken along line 6-6 of FIG. 4.

FIG. 6 illustrates the compound assembly 300 along the major plane of the unfixed bail-arm 103 and the edge of reflector 201. The arc of the unfixed bail-arm 103 is illustrated in FIG. 6. Rotation of the drive component 303 governs the motion of bail-arm 103 and defines the tilt of reflector 201 relative to the x-axis of FIG. 6.

Figure 7:
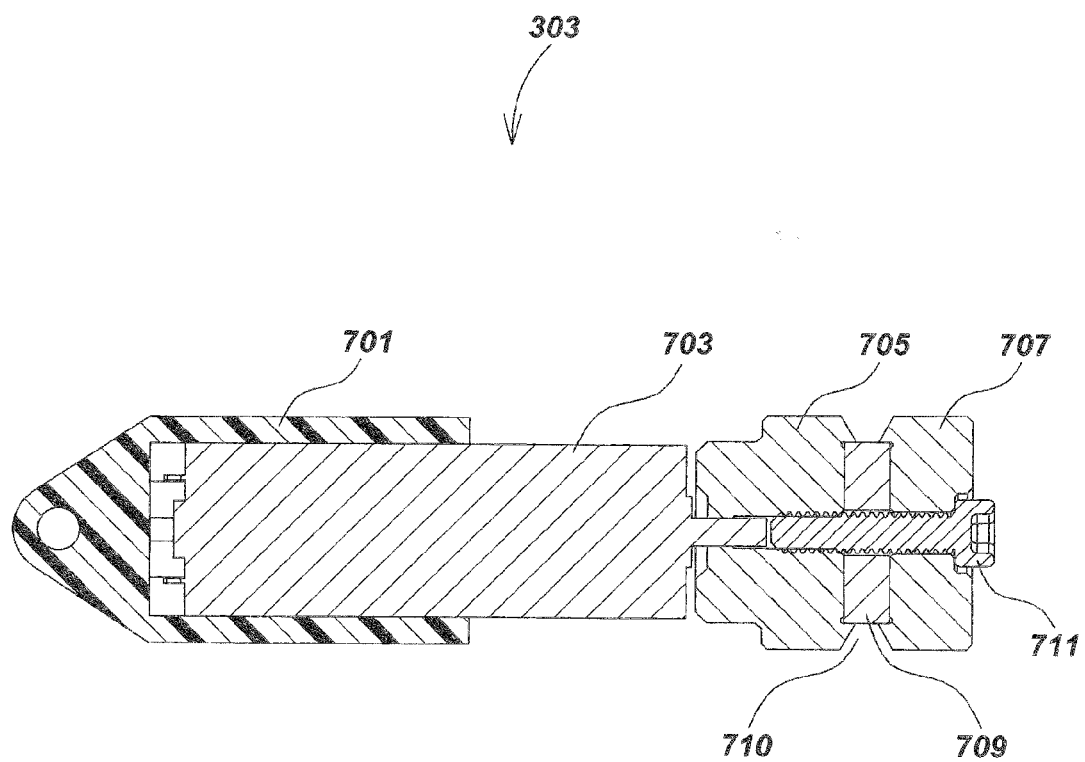
FIG. 7 is an enlarged cross-sectional view of an individual drive mechanism used in the system of FIGS. 3-6 to situate the bail-arms and orient the reflector plane.

FIG. 7 illustrates the construction of the drive motor assembly 303. In the illustrated embodiment, a magnetic drive system causes an electric motor to magnetically interface to the steel bail-arms of approximately circular cross-section which comprise the supports of the reflecting panel. A relatively small electric gear-head motor 703 is connected at one end to a molded hinge piece 701 which supports the motor 703 and allows the motor assembly 303 to pivot along one axis of rotation. The other end of motor 703 includes a shaft protruding from the motor. The motor shaft is joined to a medium-carbon steel interface block 705 by a setscrew. Interface block 705 cradles one end of a NdFeB Neodymium washer-shaped magnet 709. The distal end of magnet 709 is cradled by a 1045-medium-carbon steel drive wheel 707 whose near-end form is essentially a mirror of the interface block 705. A threaded socket-head machine screw 711 centrally connects the extended drive wheel 707, the magnet 709, and the interface block 705. As can be seen in FIG. 7, the combined profile of the interface block 705, magnet 709, and drive wheel 707 is such as to form a mechanical guide channel 710 into which one of the bail-arms 101, 103 may be drawn by the magnetic force of magnet 709, thus providing the necessary component of friction for the motor 703 to drive the bail-arm along its length. In the illustrated embodiment, the magnet 709 is a 0.5"OD Neodymium ring magnet. The other drive motor assembly 301 has a construction similar to the drive motor assembly 303. In an alternate embodiment, the extended drive wheel component 707 may be formed with a leading shaft supporting an adjustable counterweight.

Figure 8A:
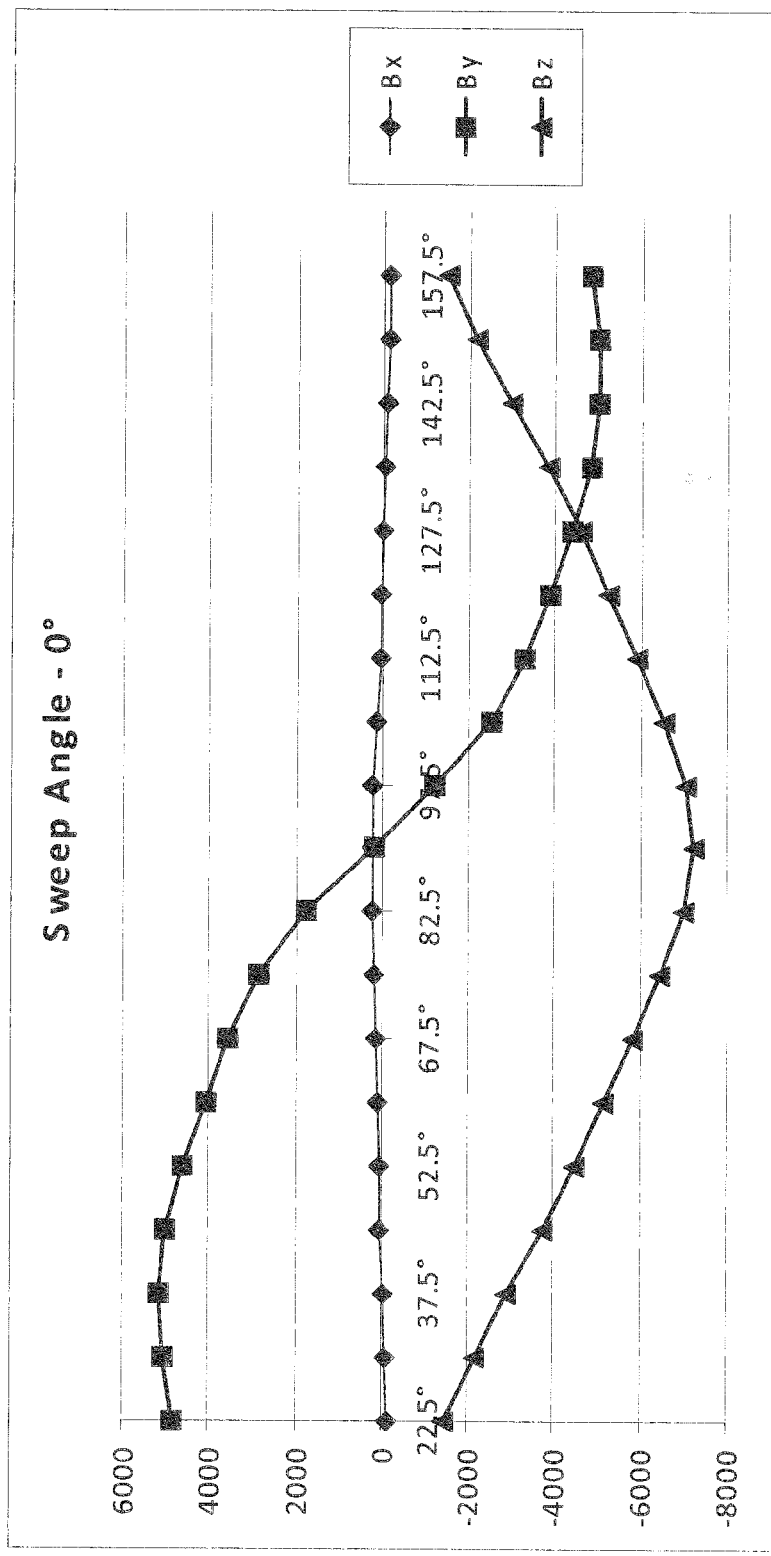
FIG. 8A, 8B, 8C, 8D, 8E, 8F, 8G, 8H, 8J, 8K, are graphs illustrating sensor outputs for angles of orientation of the system of FIGS. 3-6 from 22.5° to 157.5° of azimuth and 0° to 90° inclination.
Figure 8B:
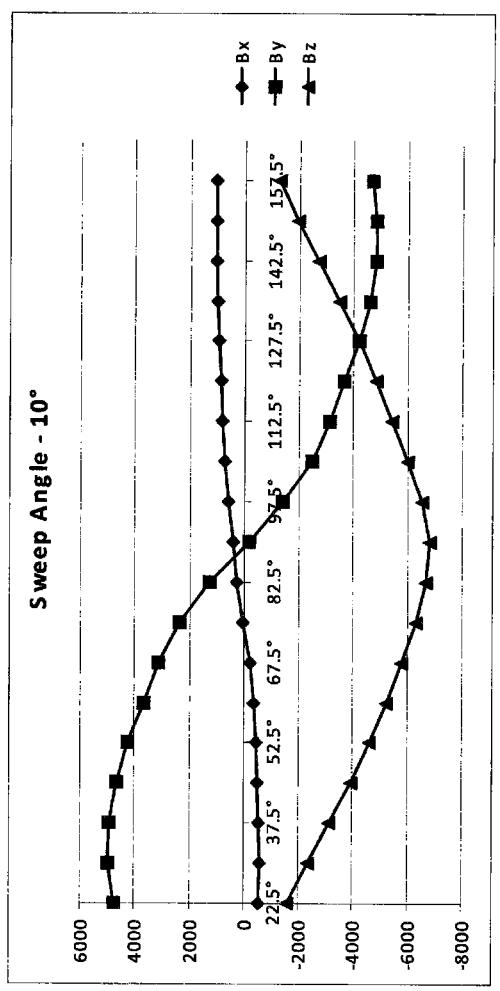
Figure 8C:
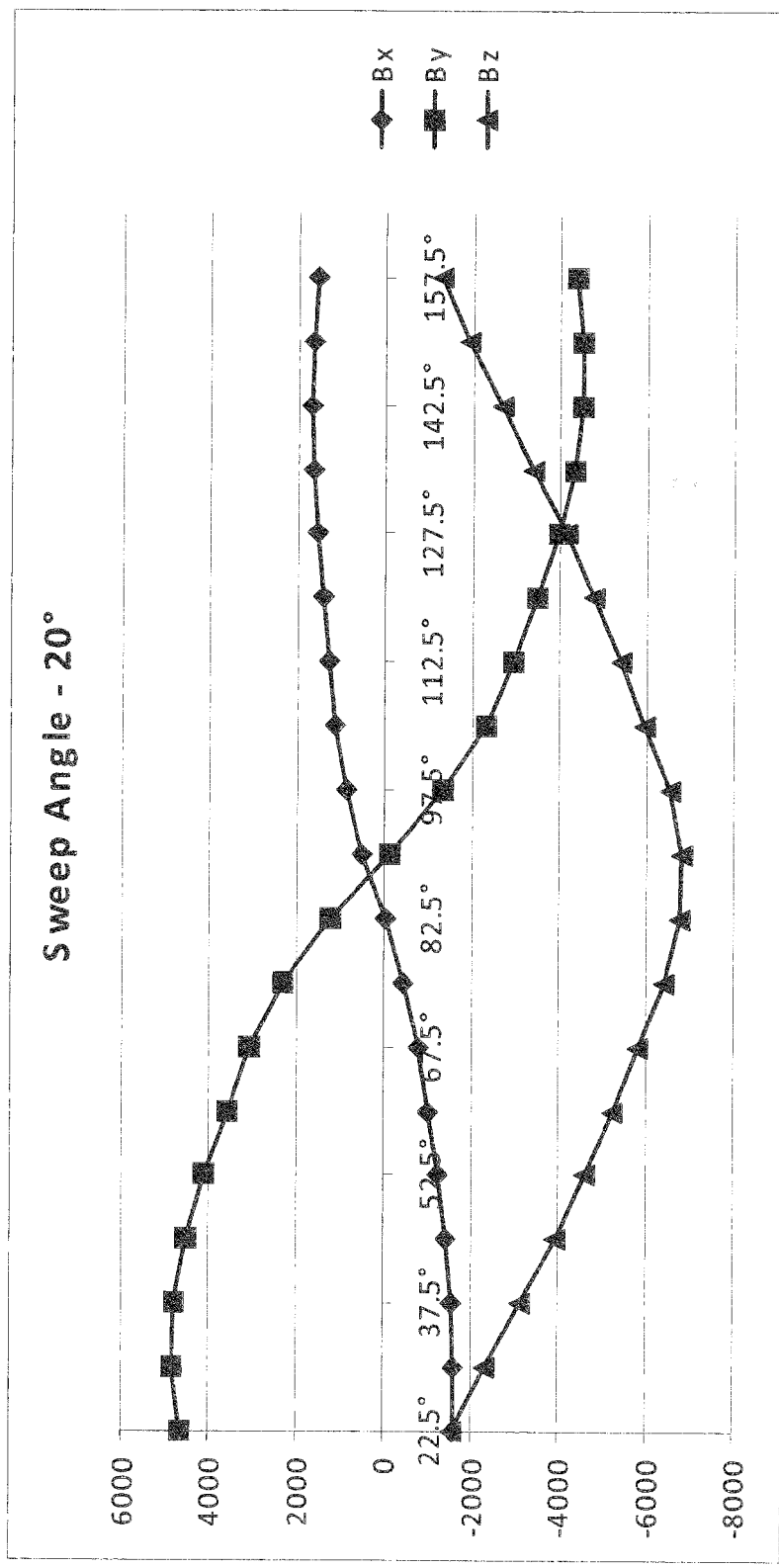
Figure 8D:
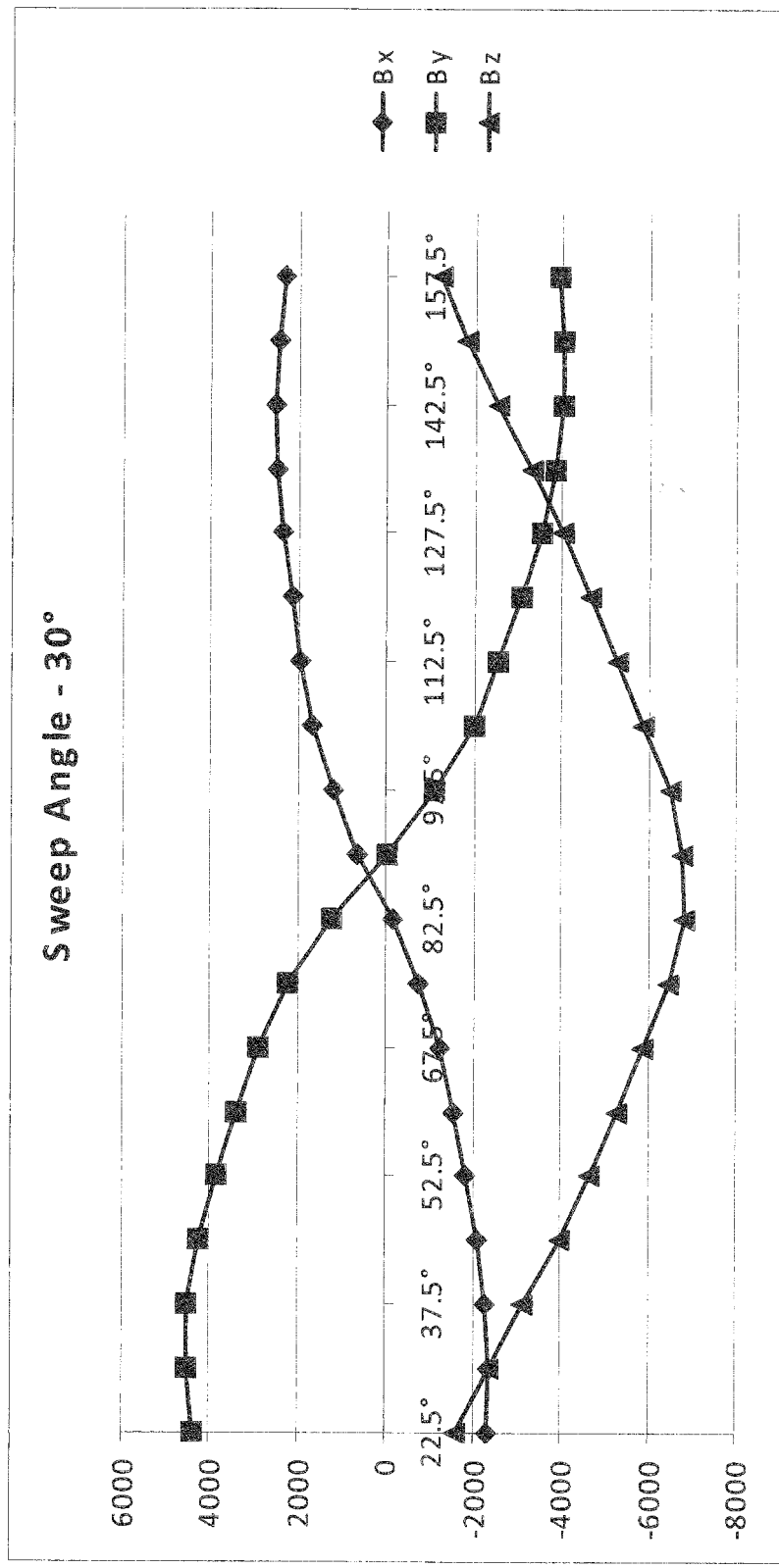
Figure 8E:
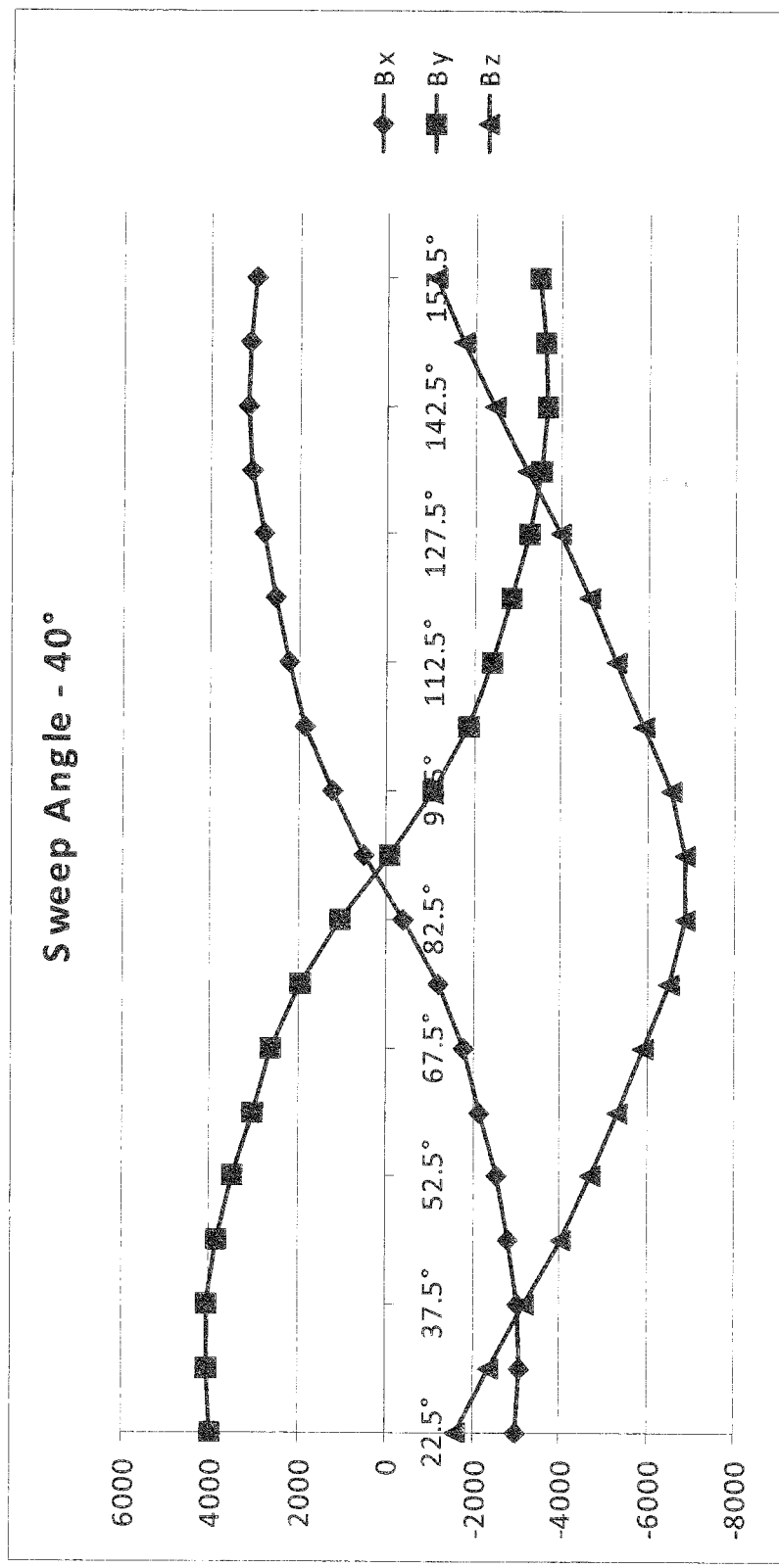
Figure 8F:
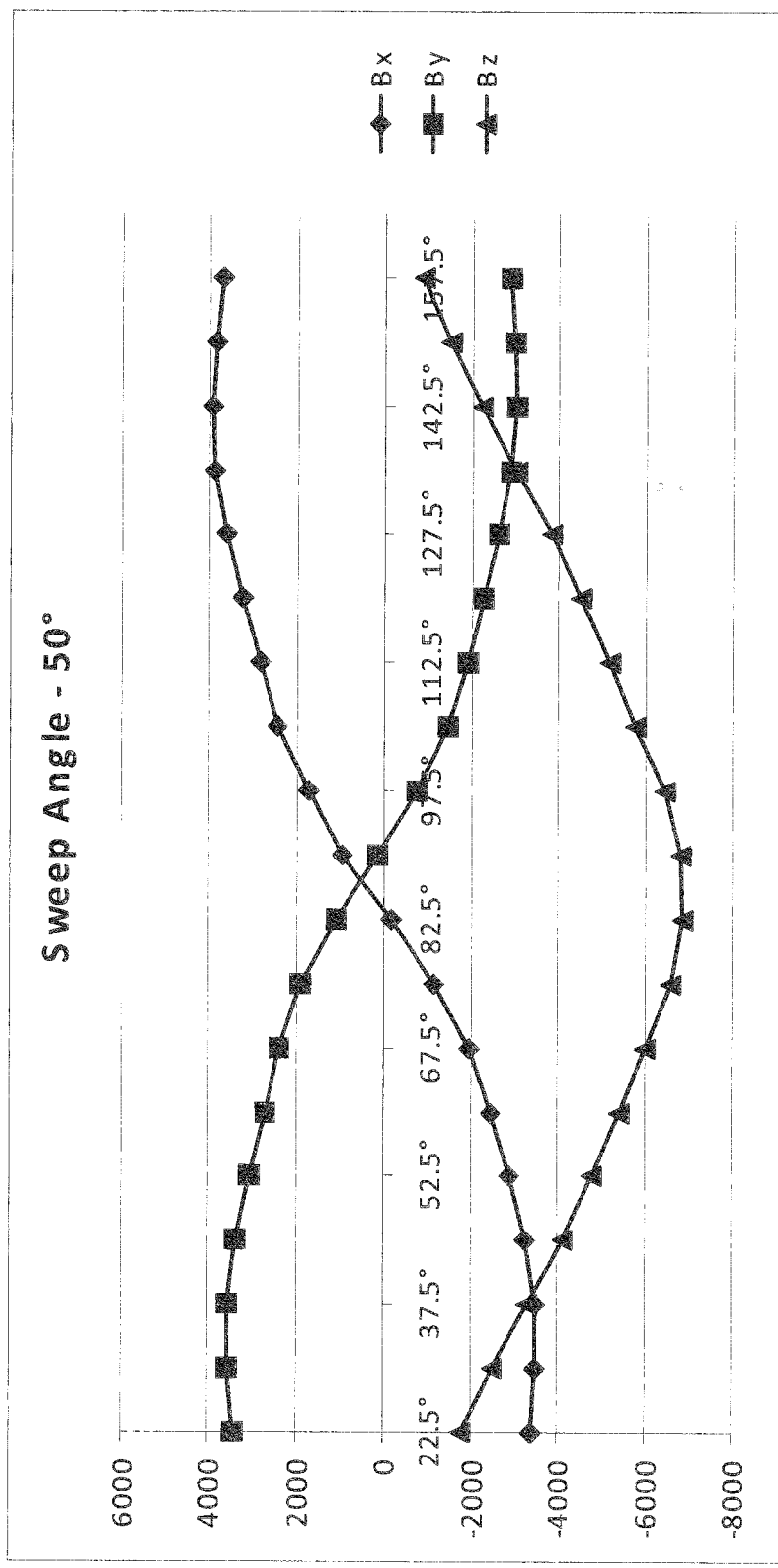
Figure 8G:
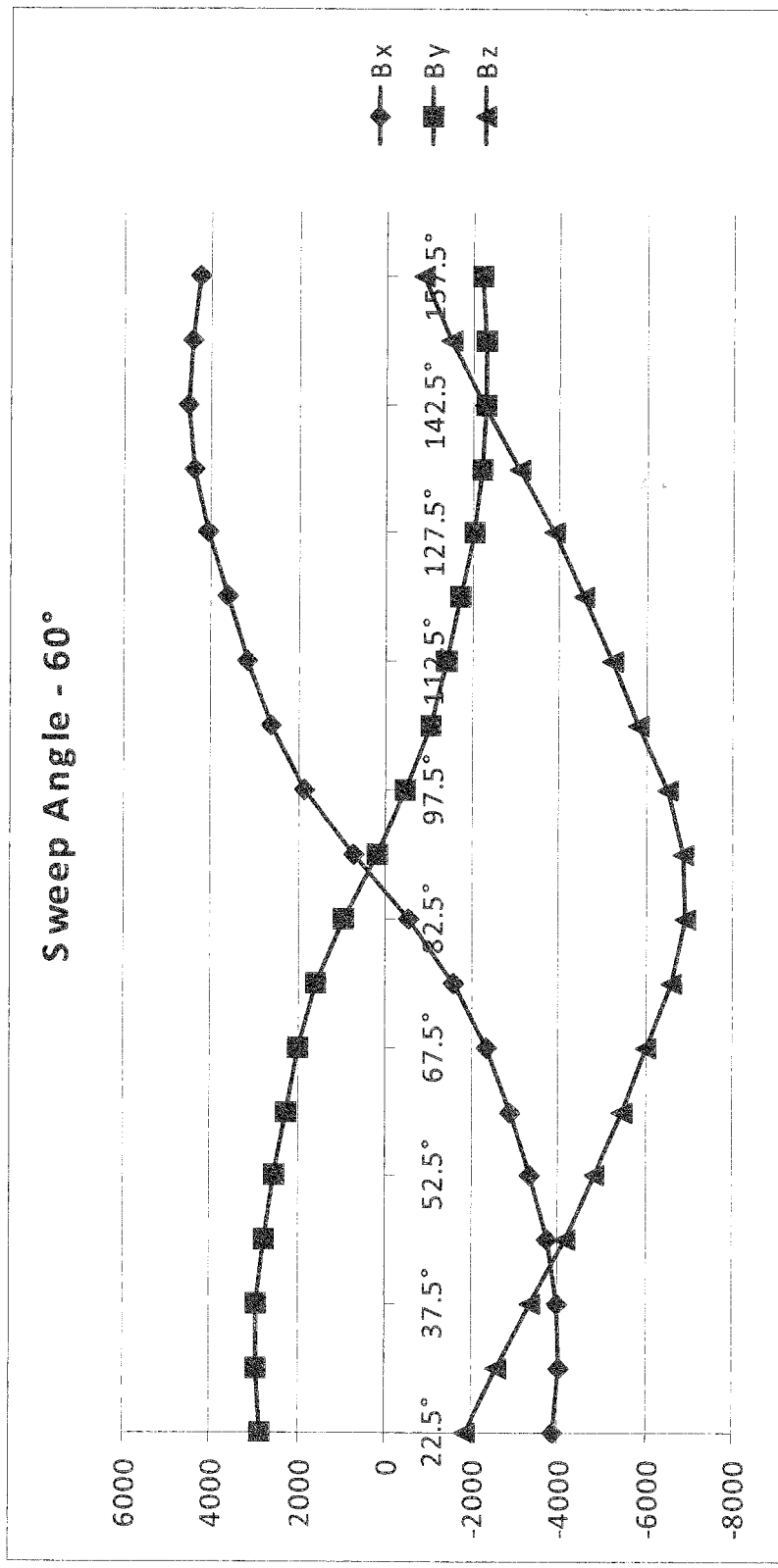
Figure 8H:
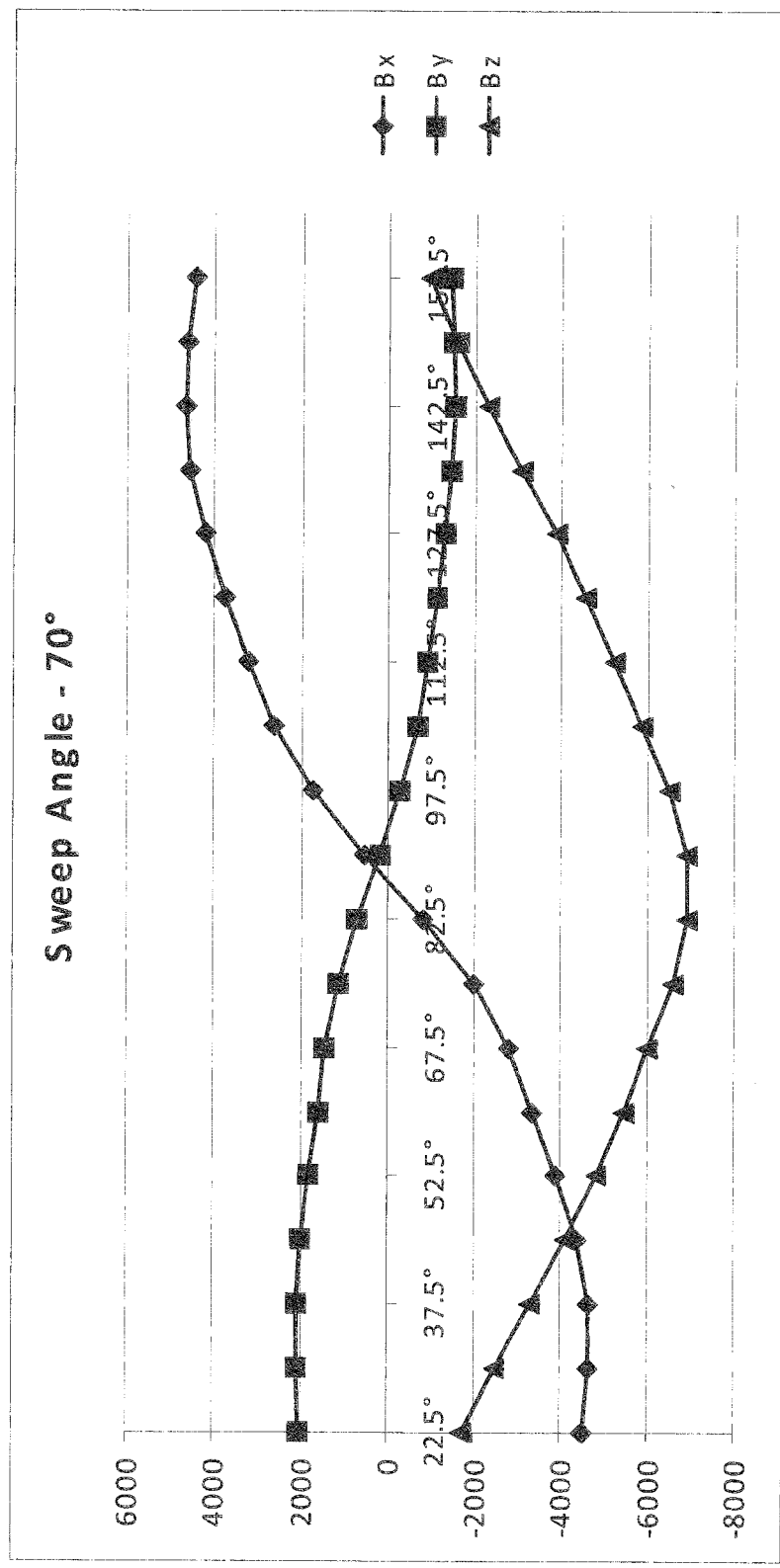
Figure 8J:
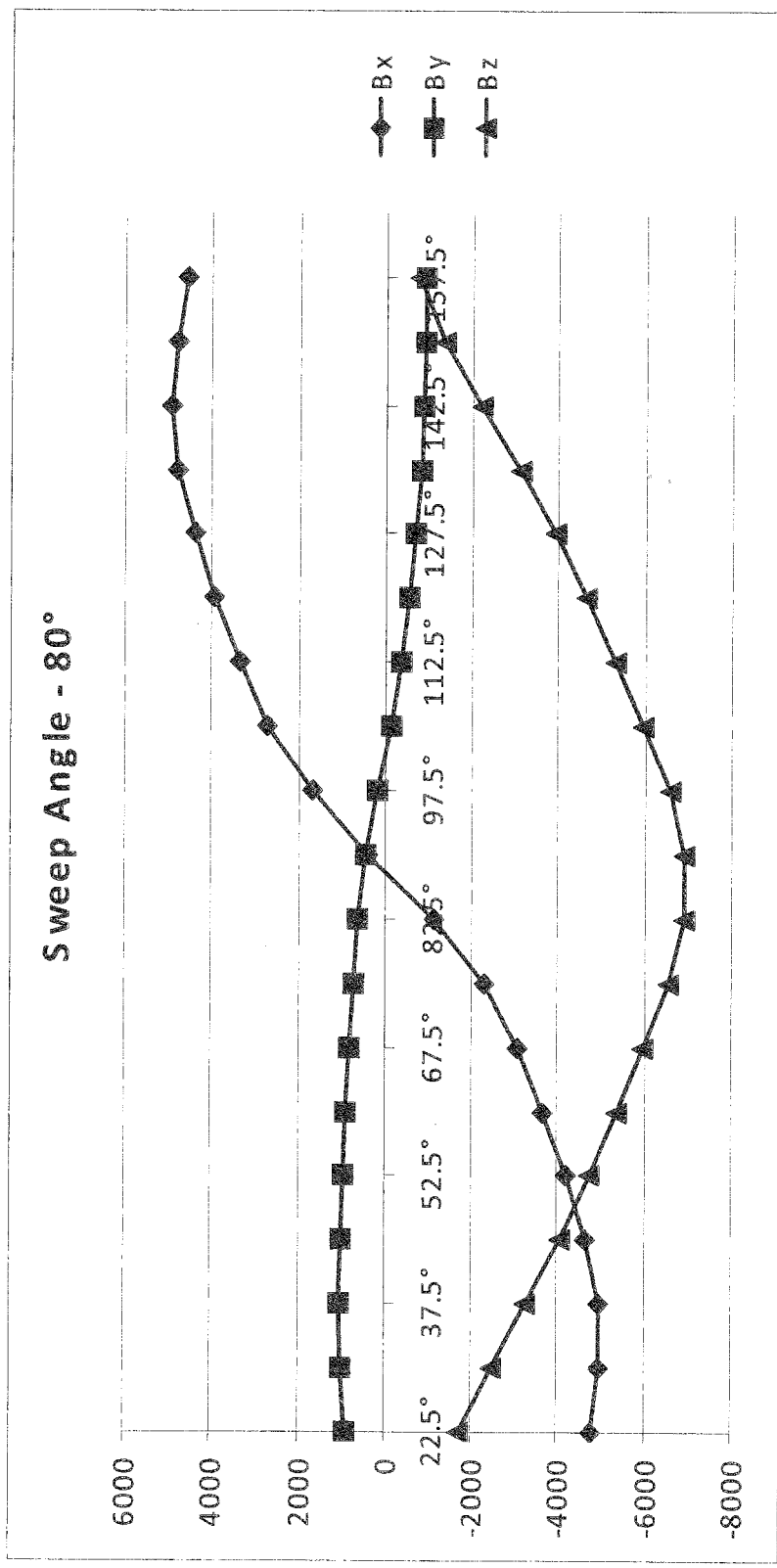
Figure 8K:
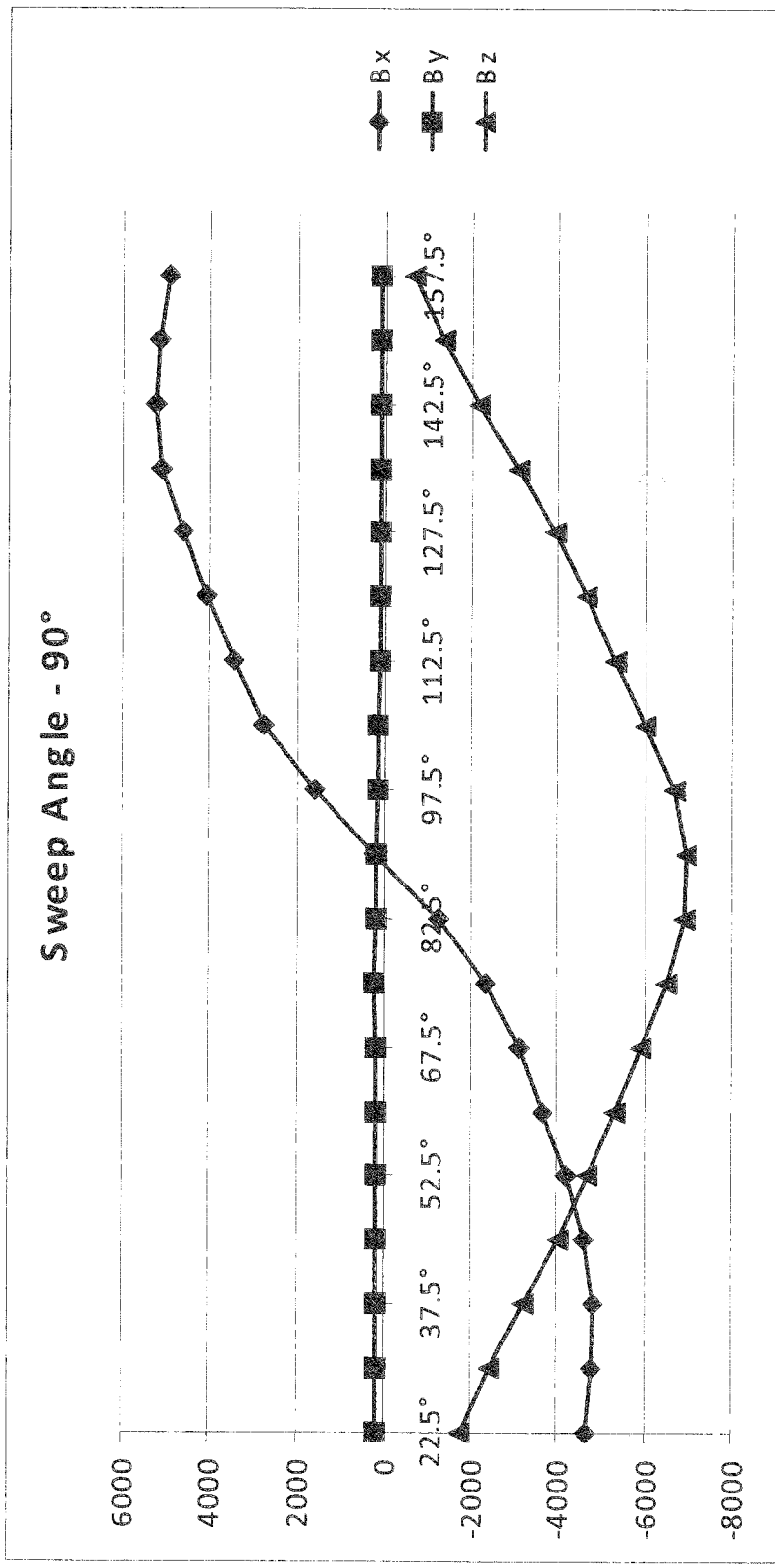

The graph of FIG. 8A illustrates flux signals output by the three-axis sensor 515b as the reflector 201 rotates in the y-plane around the ball 205 (that is, with the reflector's X-angle at zero while the Y-angle proceeds from 22.5 degrees through 90 degrees to 157.5 degrees relative to the vertical). A peak negative value is shown in the Z-axis when the sensor plane is at 90 degrees relative to the central shaft's vertical axis. This distinct pattern is a benefit of using the composite magnet assembly described in connection FIG. 5, in which a central rod-magnet protrudes above the center of a cylinder magnet forming the composite magnet 511).

In FIG. 8B through FIG. 8K, the process is repeated with the orientation of the reflector 201 incremented in 10-degree steps from 10 degrees to 90 degrees through the combined effects of the two bail-arms 101, 103 being variously positioned. In each case the advantageous distinct peak when the sensor plane is at 90 degrees relative to the vertical can be seen. In combination, the Bx, By, and Bz values provide a unique set of values for each azimuth and inclination orientation of the reflector.

Figure 9:
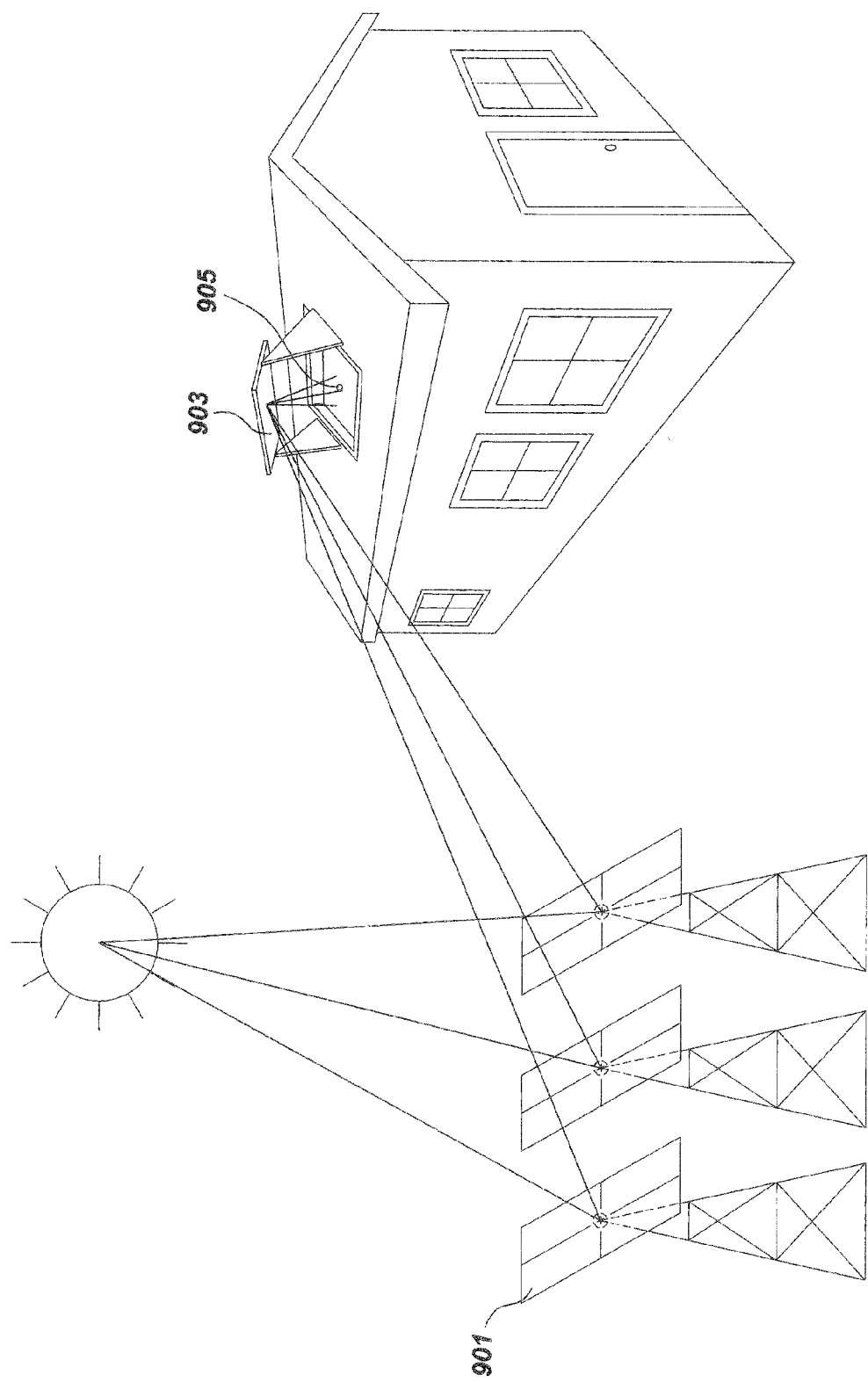
FIG. 9 is a diagrammatic illustration of and embodiment of the present invention that includes multiple reflectors and a central array-control system.

In another embodiment of the present invention multiple reflectors provide an advantage over previous art by reducing the number of sensors required to establish correct and complete control of the orientation of all of the reflectors. This benefit is achieved by using a single central intelligent control unit, rather than, in the traditional manner, requiring each reflector in a multiple-reflector array to intelligently direct itself toward the Sun's location. Referring to FIG. 9, a plurality of reflectors such as 901 are situated so as to be within the field of view of a target mirror 903 which reflects to a camera 905 below it. Target reflector 903 also serves to protect the camera 905, which receives the full field of view of the target reflector 903. This configuration may be used to reflect light into a skylight from the target reflector 903. The camera 905 gathers an image of the field of view of the target reflector 903 and detects the individual reflection of the reflectors 901 and differentiates amongst them based on a pattern of individual pixels in the camera's sensing array which were activated by individual reflectors 901. Firmware associated with the camera 905 captures the values of the multiple pixels of the camera. In a modification of the embodiment illustrated in FIG. 9, camera 905 is placed in front of the first mirror 903.

In the initialization of the embodiment of FIG. 9, the individual reflectors 901 are calibrated to flash sunlight to the target camera 905, establishing an array of points in the camera's field of view which is mapped into memory as a set of values associated with the individual reflector 901. An individual set of pixels is then mapped to each individual reflector 901. A large array of pixels can track a large number of reflectors while still being able to discriminate among them as a result of this initial mapping process.

During the day, differences in the values caused by changing light conditions may be processed using stored firmware in order to determine control outputs to the individual reflector's motor controls. This enables the system of FIG. 9 to keep individual reflectors optimally directed as the light changes, or to compensate for movement caused by wind-gusts, for example. By a process of averaging and extrapolation, the system of FIG. 9 can be prevented from causing the reflector array to search futilely under cloudy conditions, but can adjust each reflector 901 for optimum reflection of the Sun's light during normal operations. The algorithms programmed into the firmware can also accommodate re-positioning each reflector 901 at night to redirect the light from the Sun when it reappears in the morning. Control impulses sent from a microcontroller (not illustrated) associated with camera 905 may be addressed to the drive motor assemblies 301, 303 associated with either or both of the bail-arms associated with individual reflectors. Transmission of control data may be through any appropriate network connection, such as Ethernet, 802.11x wireless, or other protocol as best suits the application's requirements.

Alternative embodiments of the present invention may be used to concentrate the reflected light to provide thermal energy transfer to a heat exchange device, rather than illumination of a building interior, for example. Systems for concentrating available sunlight onto photovoltaic surfaces may also incorporate the present invention.

Clearly, other embodiments and modifications of the present invention will occur readily to those of skilled in the art, in view of the foregoing teachings. Therefore, the protection afforded the present invention is to be limited only by the following claims, which include all such embodiments and modifications when viewed in conjunction with the above specification and accompanying drawings.

We claim:
1. A solar reflector apparatus, comprising:
   a reflector;
   a pair of bail-arms connected to the reflector so that the reflector can be independently pivoted about a pair of axes of the reflector by moving the bail-arms;
   a pair of drive motor assemblies for independently moving the bail-arms;
   a magnet supported for movement relative to the reflector; and
   a sensor supported adjacent the magnet for movement with the reflector and capable of outputting signals indicative of movement of the reflector about an X axis and a Y axis.

2. The apparatus of claim 1 wherein the drive motor assemblies each include a magnetic drive that magnetically propels a corresponding one of the bail-arms.

3. The apparatus of claim 2 wherein each of the magnetic drives has a channel through which the corresponding bail-arm is driven.

4. The apparatus of claim 1 wherein the reflector is supported for pivoting motion by a ball-and-socket joint and the magnet is mounted in the ball.

5. The apparatus of claim 1 wherein the sensor is a Hall effect sensor.

6. The apparatus of claim 1 wherein the sensor is a three-axis magnetic field sensor.

7. The apparatus of claim 1 wherein the magnet is a composite magnet having a spherical outer part and a cylindrical inner part.

8. The apparatus of claim 7, wherein the outer part is a ring magnet and the inner part is axially magnetized.

9. The apparatus of claim 1 wherein each of the drive motor assemblies includes an electric gear-head motor.

10. The apparatus of claim 1 wherein the sensors provide signals indicative of movement of the reflector about an X and a Y axis in proportion to an amount of movement.

11. A solar reflector apparatus, comprising:
a reflector;
a pair of bail-arms connected to the reflector so that the reflector can be independently pivoted about a pair of axes of the reflector by moving the bail-arms; and
a pair of drive motor assemblies for independently moving the bail-arms;
wherein the sensor is supported on a circuit board in close proximity to the magnet.

12. A solar reflector apparatus, comprising:
a reflector;
a pair of bail-arms connected to the reflector so that the reflector can be independently pivoted about a pair of axes of the reflector by moving the bail-arms; and
a pair of drive motor assemblies for independently moving the bail-arms;
wherein each of the bail arms has one or more ends and one or both of the one or more ends of each bail arm is coupled to the reflector to pivot the reflector.

13. A solar reflector apparatus, comprising:
a reflector;
a ball-and-socket joint supporting the reflector for independent pivoting motion about an X axis and a Y axis;
a magnet supported in the ball of the ball-and-socket joint;
a sensor supported by the reflector adjacent the magnet for outputting signals indicative of movement of the reflector about the X axis and the Y axis; and
a pair of drive motor assemblies independently coupled to the reflector for pivoting the reflector about the X axis and the Y axis.

14. The apparatus of claim 13 wherein the sensor is a Hall effect sensor.

15. The apparatus of claim 13 wherein the sensor is a three-axis magnetic field sensor.

16. The apparatus of claim 13 wherein the magnet has a spherical outer part and a cylindrical inner part.

17. The apparatus of claim 13 wherein the sensor is supported on a circuit board in close proximity to the magnet.

18. The apparatus of claim 13 wherein each drive motor assembly includes an electric gear-head motor.

19. A solar reflector apparatus, comprising:
a reflector;
a ball-and-socket joint supporting the reflector for independent pivoting motion about an X axis and a Y axis;
a ball interface and column assembly supporting a ball in the ball-and-socket joint in a stationary position relative to the reflector; a housing supporting the ball interface and column assembly;
a magnet supported in the ball of the ball-and-socket joint;
a sensor supported by the reflector adjacent the magnet for outputting signals indicative of movement of the reflector about the X axis and the Y axis;
a pair of bail-arms hingedly connected to the reflector and passing through the housing so that the reflector can be independently pivoted about the X and Y axes by moving the bail-arms; and
a pair of drive motor assemblies mounted in the housing, each of the drive motor assemblies including a magnetic drive that magnetically propels a corresponding one of the bail-arms so that the reflector can be independently pivoted about the X axis and the Y axis.

20. A solar reflector apparatus, comprising:
a reflector;
a ball-and-socket joint supporting the reflector for independent pivoting motion about an X axis and a Y axis;
a magnet supported in the ball of the ball-and-socket joint;
a sensor supported by the reflector adjacent the magnet for outputting signals indicative of movement of the reflector about the X axis and the Y axis;
a pair of drive motor assemblies independently coupled to the reflector for pivoting the reflector about the X axis and the Y axis; and
a pair of bail-arms hingedly connected to the reflector and coupled to corresponding ones of the drive motor assemblies so that the reflector can be independently pivoted about the X and Y axes by moving the bail-arms.

21. The apparatus of claim 20 wherein the drive motor assemblies each include a magnetic drive that magnetically propels a corresponding one of the bail-arms.

22. The apparatus of claim 21 wherein each of the magnetic drives has a channel through which the corresponding one of the bail arms is driven.

* * * * *